United States Patent
Lee

(10) Patent No.: US 10,072,981 B2
(45) Date of Patent: Sep. 11, 2018

(54) COLOR SENSOR ARRANGEMENT AND METHOD FOR COLOR SENSOR CALIBRATION

(71) Applicant: ams AG, Unterpremstaetten (AT)

(72) Inventor: Glenn Lee, Plano, TX (US)

(73) Assignee: ams AG, Unterpremstaetten (AT)

( * ) Notice: Subject to any disclaimer, the term of this patent is extended or adjusted under 35 U.S.C. 154(b) by 53 days.

(21) Appl. No.: 15/027,239

(22) PCT Filed: Sep. 24, 2014

(86) PCT No.: PCT/EP2014/070388
§ 371 (c)(1),
(2) Date: Apr. 4, 2016

(87) PCT Pub. No.: WO2015/049143
PCT Pub. Date: Apr. 9, 2015

(65) Prior Publication Data
US 2016/0245695 A1   Aug. 25, 2016

Related U.S. Application Data

(60) Provisional application No. 61/886,927, filed on Oct. 4, 2013.

(30) Foreign Application Priority Data

Oct. 16, 2013   (EP) ..................................... 13188936

(51) Int. Cl.
*G01J 3/02*        (2006.01)
*G01J 3/51*        (2006.01)
(Continued)

(52) U.S. Cl.
CPC ........... *G01J 3/0297* (2013.01); *G01J 3/0213* (2013.01); *G01J 3/462* (2013.01); *G01J 3/465* (2013.01); *G01J 3/505* (2013.01); *G01J 3/513* (2013.01)

(58) Field of Classification Search
CPC ........ G01J 3/0297; G01J 3/462; G01J 3/0213; G01J 3/465; G01J 3/505; G01J 3/513
See application file for complete search history.

(56) References Cited

U.S. PATENT DOCUMENTS

| 5,850,472 A * | 12/1998 | Alston | ...................... G01J 3/10 |
| | | | 382/162 |
| 2007/0177230 A1* | 8/2007 | Kreysar | ................ G01J 3/2823 |
| | | | 358/504 |

(Continued)

FOREIGN PATENT DOCUMENTS

| CN | 101881657 A | 11/2010 |
| CN | 202153766 U | 2/2012 |

(Continued)

OTHER PUBLICATIONS

Lim at al. "Integration of image capture and processing: beyond single-chip digital camera" Proc. SPIE 4306, Sensors and Camera Systems for Scientific, Industrial, and Digital Photography Applications II, (May 15, 2001).*

(Continued)

*Primary Examiner* — Dominic J Bologna
(74) *Attorney, Agent, or Firm* — McDermott Will & Emery LLP

(57) ABSTRACT

A color sensor arrangement comprises a color sensor arranged to generate at least a first channel signal being indicative of a color of light incident on the color sensor. A processing unit is connected to the color sensor and arranged to generate a tuple of color signals by processing the at least first channel signal. A memory is connected to the processing unit and a control unit is connected to the processing unit and to the memory. Furthermore, the control unit is arranged to receive calibration data relating the tuple of color signals to a calibrated tuple of color signals and arranged to store said calibration data (M) by means of the memory. An interface is connected to the processing unit and comprises an interface terminal.

22 Claims, 2 Drawing Sheets

(51) Int. Cl.
*G01J 3/46* (2006.01)
*G01J 3/50* (2006.01)

(56) References Cited

U.S. PATENT DOCUMENTS

| | | | |
|---|---|---|---|
| 2010/0128155 A1* | 5/2010 | Ahn | G01J 3/0259 |
| | | | 348/308 |
| 2010/0314543 A1* | 12/2010 | Lee | G01J 3/02 |
| | | | 250/330 |
| 2012/0019669 A1* | 1/2012 | Bai | H01L 27/14632 |
| | | | 348/187 |
| 2013/0002731 A1 | 1/2013 | Tam | |

FOREIGN PATENT DOCUMENTS

| | | |
|---|---|---|
| EP | 2261690 A2 | 12/2010 |
| JP | 2011089840 A | 5/2011 |
| TW | 201101475 A | 1/2011 |
| WO | 2004/097783 A1 | 11/2004 |

OTHER PUBLICATIONS

Lim, S. et al.: "Integration of Image Capture and Processing Beyond Single Chip Digital Camera", Sensors and Camera Systems for Scientific, Industrial, and Digital Photography Applications II, Proceedings of SPIE vol. 4306, Jan. 2001, pp. 219-225.

\* cited by examiner

COLOR SENSOR ARRANGEMENT AND METHOD FOR COLOR SENSOR CALIBRATION

This disclosure relates to a colour sensor arrangement and to a method for colour sensor calibration.

BACKGROUND OF THE INVENTION

Colour sensing for the LED market is an emerging technology as companies are considering incorporating solutions into their portfolios. Conversely, the LED market is a fairly mature market with various manufacturers that include makers of LED modules, LED engines, luminaires, smartphones, flat panel TVs, laptops, etc. These manufacturers follow the performance standards established by a number of organizations including ANSI/ANSLG, CIE, IES, and NEMA for LED component manufacturers, luminaire manufacturers, etc. Many customers express a desire of having a colour sensor that can support high accuracy, e.g. a $\Delta u'v'$ of 0.001 to 0.002 which implies a very tight device-to-device tolerance. Given the complexity of transforming, for example, RGB counts per $\mu w\ cm^2$ to CIE XYZ tristimulus colour space, decreasing the variance will not likely by itself address the desired degree of accuracy.

In general, all possible variances of a device must be minimized in order to increase detection accuracy. The device-to-device accuracy is expected to be in terms of colour temperature, Duv, or $\Delta u'v'$. Ultimately, the market is demanding that the colour sensor correspond to the CIE standard colour-matching function with a very high degree of repeatability.

Typically, standard process manufacturing which includes common process and non-proprietary filter material is employed in order to keep the device cost low. Unfortunately, the colour filter spectral curves do not match the standard colour-matching function of the CIE standard, for instance. In addition, the colour filters are affected by their absorption coefficient, filter thickness, and concentration. The infrared (IR) deposit typically also has a "rippling effect" with peaks and troughs that affect the RGB colour response as well. Furthermore, there are other silicon related effects that impact the device-to-device performance, for example temperature coefficient, that must be addressed to minimize the $\Delta u'v'$ resolution across the entire operating temperature of the device.

Currently, efforts to minimize device-to-device tolerance are typically addressed either through wafer or post-package trimming or else by testing and binning devices. Temperature compensation techniques are also employed to improve device accuracy. Colour space transformations are virtually always performed off-device. As a result, device-to-device tolerance for a widely accepted (or custom) colour space transformation can vary from part to part if the testing environment is not tightly controlled by a third-party. There is no current solution that is able to provide very accurate device-to-device tolerances natively for third-party colour transformations.

SUMMARY OF THE INVENTION

A colour sensor arrangement comprises a colour sensor, a processing unit connected to the colour sensor, a memory connected to the processing unit, and a control unit connected to the processing unit and to the memory. Finally, an interface is connected to the processing unit and comprises an interface terminal.

The colour sensor is arranged to generate at least a first channel signal which is indicative of a colour of light incident on the colour sensor. The processing unit receives the at least first channel signal and processes this signal to generate a tuple of colour signals. The control unit is arranged to receive calibration data via the interface which relates the tuple of colour signals to a calibrated tuple of colour signals. Furthermore, the control unit is also arranged to store said calibration data by means of the memory.

The term "calibration data" constitutes a relation or function in a mathematical sense. The calibrated tuples of colour signals are elements of a colour space. The colour space, generally, relates to a colour model which is an abstract mathematical model describing the way colours can be represented as tuples, typically as three or four values or colour components, e.g. RGB and CMYK. For example, the first channel signal can be used to evaluate the brightness of a single, defined colour. The tuple of colour signals then comprises just a single component. A bi-colour space can be represented by the at least first channel signal and a second channel signal. Correspondingly, the tuple of colour signals then comprises two components. A colour space of three colours can be defined by the first and second channel signals and a third channel. Further channel signals can be added as needed defining corresponding multi-colour spaces.

The term calibration data is used with no restrictions placed on, for example,
1) the number of coefficients in the representation,
2) the type of algorithms used internally or externally such as to linear transformation matrices,
3) the embodiment of colour space transformations,
4) the type of colour-matching functions employed,
5) the number of device outputs (e.g. three for RGB colour sensor), or
6) whether the algorithms are performed on or off the colour sensor arrangement.

The processing unit can either be analog or digital. Preferably, a processing by the processing unit involves integrating of the at least first channel signal for a certain period of time to increase signal strength. For example, a number of counts per time period is a convenient measure of signal strength or brightness.

In case of more than a single channel signal and despite processing by means of the processing unit the channel signals can be provided as separate colour components, i.e. the tuple of colour signals comprises several individual colour components, like red, green, and blue components.

The colour sensor arrangement allows for very accurate device-to-device tolerances which can be achieved natively for third-party colour transformations. Colour transformations such as the CIE XYZ tristimulus values are often the desired output of a colour sensor device. According to the presented disclosure, standard process manufacturing techniques (e.g. without the use of custom filters) can be used to achieve a very high device-to-device tolerance and an accurate XYZ tristimulus (or some other colour transformation coordinate) output on-chip by generating the coefficients from an algorithm, such as CIE XYZ tristimulus matrix transformation, then storing them in non-volatile memory so that the coefficients always track with the device. This way the memory holds the individual data which is characteristic for the particular colour sensor arrangement.

The memory can be read out by further external components in any device or by dedicated units of the colour sensor arrangement and provides the data to perform colour transformation. It provides better and tighter accuracy in terms of colour temperature, Duv and Δu'v' output that customers require. High-accuracy is critical in multiple LED markets in order for colour sensors to be adopted in high volumes. The present disclosure provides a more complete colour sensing solution as opposed to merely providing a component with relative radiometric output of µW per cm$^2$.

In an embodiment of the colour sensor arrangement the colour sensor comprises an array of photo elements. The array may comprise individual photo elements which are interconnected among each other. But the array of photo elements may also comprise a CCD or CMOS photo element which have a photosensitive area of pixels.

In a further embodiment of the colour sensor arrangement the colour sensor comprises a first, second, third and fourth photodiode. The first photodiode is arranged to generate the first channel signal, the second photodiode is arranged to generate the second channel signal, the third photodiode is arranged to generate a third channel signal and the fourth photodiode is arranged to generate a fourth channel signal. The processing unit is arranged to generate the tuple of colour signals by processing the first, second, third and fourth channel signals.

In a further embodiment of the colour sensor arrangement the colour sensor is covered by an infrared blocking filter. The first, second and third photodiodes are covered by a first, second and third filter, respectively.

In a further embodiment of the colour sensor arrangement the processing unit comprises a multichannel integrating analog-to-digital converter connected to the colour sensor. A data register is connected to the multichannel integrating analog-to-digital converter. The multichannel integrating analog-to-digital converter is arranged for receiving the at least first channel signal. Similarly, the data register is arranged for storing the at least first and second integrated channel signals.

In a further embodiment of the colour sensor arrangement the multichannel integrating analog-to-digital converter is further arranged for receiving the third and fourth channel signals. The data register is arranged for storing the third and fourth channel signals.

In a further embodiment of the colour sensor arrangement the processing unit comprises an arithmetic unit connected to the memory. The arithmetic unit is arranged to read the calibration data from the memory and transform the tuple of colour sensor signals into the calibrated tuple of colour sensor signals depending on the calibration data. This way there is an on-chip correction of colour signals and the colour sensor arrangement outputs calibrated tuples of colour signals.

In a further embodiment of the colour sensor arrangement the control unit is connected to the interface terminal. The control unit is arranged to initialize a calibration mode of the colour sensor arrangement depending on whether a calibration signal is applied to the interface terminal.

In a further embodiment of the colour sensor arrangement the control unit, in the calibration mode, receives the calibration data via the interface terminal and writes said calibration data into the memory. In a certain sense this implementation of the calibration mode could be called external calibration mode. The calibration data is determined externally, e.g. by a test environment or by a customer, but based on the tuple of colour signals.

In another embodiment of the colour sensor arrangement the arithmetic unit, in the calibration mode, computes the calibration data from the tuple of colour sensor signals and depending on a colour module. The control logic receives the calibration data via the arithmetic unit and writes said calibration data into the memory. In a certain sense this implementation of the calibration mode could be called internal calibration mode. The calibration data is determined internally, i.e. by means of the arithmetic unit.

In another embodiment of the colour sensor arrangement the interface is arranged for bidirectional communication. Furthermore, the control unit is arranged for synchronizing the calibration mode to the calibration signal to be applied at the interface terminal.

A method for colour sensor calibration comprises the step of generating at least a first channel signal by means of a colour sensor of a colour sensor arrangement. The first and second channel signals are indicative of a colour of light reflected from or emitted by a calibration source. Then, a tuple of colour signals is generated by processing the at least first signal. Calibration data is determined and relates the tuple of colour sensor signals to a colour module. Finally, the calibration data is written into a memory wherein the memory is comprised by the colour sensor arrangement.

The calibration source can be a colour chart comprising a number of colour patches. The reflection of light from the colour patches under standard conditions is known to a high degree and provided by the manufacturer of the chart. Alternatively, the colour sensor can be calibrated using the defined emission of a calibration source.

In a further embodiment of the method for colour sensor calibration the calibration source is illuminated by means of a calibration light source. The calibration light source typically is a standardized light source of known spectral distribution, e.g. CIE D$_{65}$. The light emitted by the calibration light source can be detected by the colour sensor directly or via reflection on calibrated colour chart. This way the colour sensor can be calibrated to output normalized brightness values and/or colour values.

According to another embodiment of the method for colour sensor calibration the tuple of colour signals is read by an external processing means. The external processing means uses the tuple of colour signals to derive the calibration data and return said calibration data to the colour sensor arrangement via the interface.

In another embodiment of the method for colour sensor calibration the tuple of colour signals is input to an arithmetic unit comprised by the colour sensor arrangement. The calibration data is determined by means of the arithmetic unit and depending on a colour model, e.g. CIE XYZ.

In the following, the principle presented above will be described in more detail with respect to drawings in which exemplary embodiments are shown. Similar and corresponding elements among the embodiments are designated with the same reference numerals.

DETAILED DESCRIPTION

Figure 1:
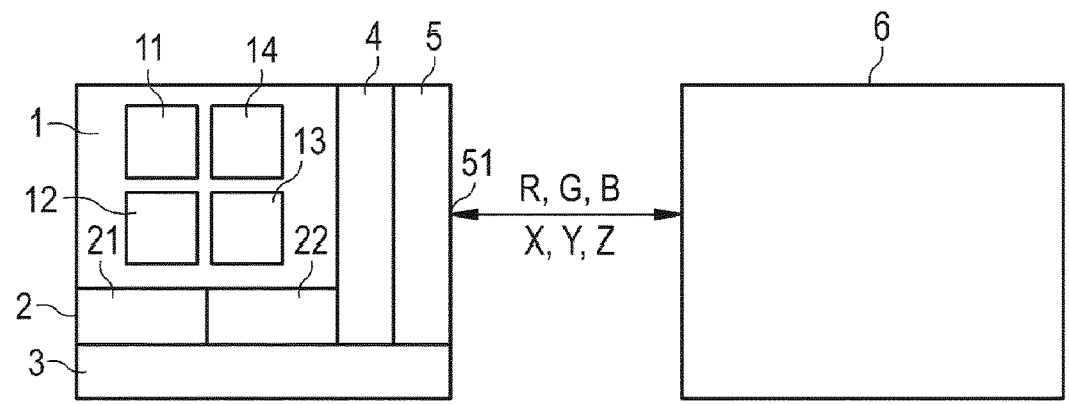
FIG. 1 shows an embodiment of the colour sensor arrangement.

FIG. 1 depicts a general scheme of an embodiment of the colour sensor arrangement. The colour sensor arrangement comprises a colour sensor 1, a processing unit 2, a memory 3, a control unit 4, and an interface 5.

The colour sensor 1 further comprises an array of photo elements which, in this particular embodiment, comprises a first, second, third, and fourth photodiode 11, 12, 13, 14. The first, second, and third photodiodes (11, 12, 13) are covered by a first, second and third filter, respectively (not shown). The pass band of the first, second and third filter are adjusted so that they pass only a certain band of light. For example, the first filter has a pass band in the red, the second filter in the green, and the third filter in the blue part of the visible electromagnetic spectrum. The fourth photodiode 14 is not covered by a filter. Alternatively, however, also the fourth photodiode can be covered by a filter having a band according to a yet another part of the visible electromagnetic spectrum.

The photodiodes 11, 12, 13, 14 are made from a material such that they are sensitive to visual light, near infrared and ultra violet, e.g. Silicon, Germanium, Indium gallium arsenide or Lead(II) sulphide. Typically all photodiodes 11, 12, 13, 14 implemented in the colour sensor 1 are of the same type. This may, however, vary if a given application befits from having implemented different types. Instead of photodiodes the array of photo elements may comprise other photo elements like a CCD or CMOS photo element. The array may be implemented by having the filters cover only part of the array.

The processing unit 2 preferably further comprises a multi-channel integrating analog-to-digital converter 21 connected to the colour sensor 1 and a data register 22 connected to the multi-channel integrating analog-to-digital converter 21. The processing unit 2 is further connected to the memory 3. The memory 3 comprises a non-volatile memory. Moreover, the control unit 4 is connected to the processing unit 2 and to the memory 3. The control unit 4 comprises a state machine, a logic, and/or a microcontroller. Finally, the interface 5 is connected to the processing unit 2 (not shown for easier illustration) and comprises an interface terminal 51.

The processing unit 2 does not have to be digital. The multi-channel integrating analog-to-digital converter 21 the data register 22 can be substituted by analog units as well.

In operation, the colour sensor arrangement receives light from its environment (indicated as arrows in the drawing). The received light is characterized by a certain spectral power distribution. From this light the colour sensor 1 generates a number of channel signals which correspond to the particular photo elements in the sensor array. In this embodiment the first photodiode 11 gives rise to a first channel signal CH1, the second photodiode 12 gives rise to a second channel signal CH2, the third photodiode 13 gives rise to a third channel signal CH3 and the fourth photodiode 14 gives rise to a fourth channel signal CH4. The generated channel signals, however, generally do not have the same spectral response as, for example, the human eye or any desired spectral response curves defined by the application. Thus, the raw channel signals typically need further processing, for example, in order to relate to colour matching functions of a standardized colour space.

In a first step, the channel signals CH1, CH2, CH3 and CH4 are collected by the processing unit 2. For convenient data collection the processing unit 2 comprises the multi-channel integrating analog-to-digital converter 21. The multi-channel integrating analog-to-digital converter 21 collects the corresponding channel signals CH1, CH2, CH3, and CH4 for a given, pre-defined period of time which can be set and controlled by means of the control unit 4. The resulting integrated channel signals are then moved into corresponding data register 22 from where they can be read out for further processing. As mentioned above the data collection can also be implemented by means of analog units.

In this embodiment the processing unit 2 is also arranged to perform basic data correction. The fourth channel signal CH4 basically is a clear signal CL and is generated by means of the fourth photodiode 14. This photodiode 14 either has no filter or at least a (reference) filter as discussed above. Typically, the fourth channel signal CH4 can be used to correct or normalize the other channel signals CH1, CH2, CH3 as it accounts for infrared content in the spectral power distribution collected by the colour sensor 1, for example. Using logical operations like additions or multiplications the channel signals CH1, CH2, CH3 are then corrected by means of the fourth channel signal CH4. This can be implemented by logical units like adders or multipliers (not shown). The so corrected and processed signals constitute a tuple of colour signals R, G, B hereinafter.

The reference numerals R, G, B preferably relate to the colour components red, green, and blue to indicate the band pass of the filters as mentioned above. Then the tuple has a red component R, a green component G, and a blue component B. However, generally other colours (e.g. more than three) or other band pass filters are possible and are only restricted by the particulars of the given application. For example, the tuple R, G, B may comprise more than three individual signals, like CMYK (cyan, magenta, yellow, and key (black)).

The control unit 4 is arranged to control all necessary timing in the colour sensor arrangement. As mentioned above, one operation controlled by the control unit 4 is the operation of the processing unit 2, e.g. basic processing, signal integration and temporal saving by means of the multi-channel integrating analog-to-digital converter 21 and data registers 22, respectively. Furthermore, the control unit 4 is arranged to receive calibration data M relating the tuple of colour signals R, G, B to a calibrated tuple of colour signals X, Y, Z. The particulars of the calibration data M will be discussed in further detail below. In addition, the control unit 4 is arranged to store said calibration data M by means of the memory 3.

The interface 5 is arranged for bidirectional communication via the interface terminal 51. During normal operation the tuple of colour signals R, G, B is provided at the interface terminal 51 which may comprise separate sub-terminals for each component of the tuple. Optionally, a calibration signal INT can be applied to the interface terminal 51 and enters the colour sensor arrangement into a calibration mode. In this calibration mode data acquisition of channel signals CH1, CH2, CH3, CH4 can be synchronized, for example, to an external calibration source. Such synchronization is convenient but not necessary. The colour sensor arrangement, alternatively, can provide the tuple of colour signals R, G, B in a continuous fashion, not synchronized to an external calibration signal. The interface terminal 51, however, generally is used to receive calibration data M and the control unit 4 is set to store this data by means of the memory 3.

Figure 2:
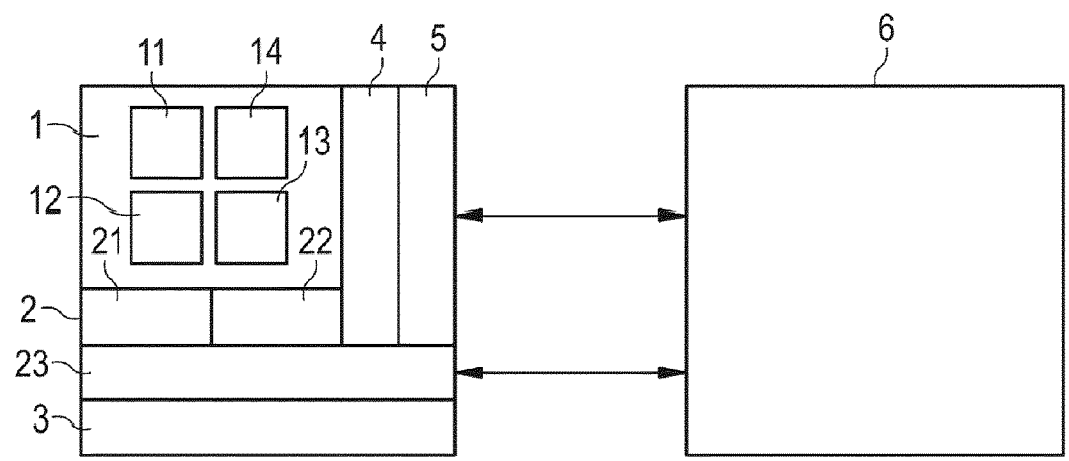
FIG. 2 shows another embodiment of the colour sensor arrangement.

FIG. 2 shows another embodiment of the colour sensor arrangement. This embodiment is the same as the one presented in FIG. 1 but the processing unit 2 further comprises an arithmetic unit 23 connected to the memory 3. During normal operation the arithmetic unit 23 reads the calibration data M from the memory 3 and transforms the tuple of colour signals R, G, B into the calibrated tuple of colour signals X, Y, Z depending on the calibration data M. In other words, the colour sensor arrangement comprising the arithmetic unit 23 has an output which already is calibrated according to a certain standard (see below). The colour sensor arrangement according to FIG. 1 has a non-calibrated output which needs to be externally calibrated by reading out and using the calibration data M from the memory 3.

Furthermore, during the calibration mode the arithmetic unit 23 internally computes the calibration data M from the tuple of colour signals R, G, B. As mentioned above, the calibration can be synchronized to an external means by applying the calibration signal INT at the interface terminal 51. The control logic 4 receives the calibration data M via the arithmetic unit 23 and writes said calibration data M into the memory 3. Preferably, both the arithmetic unit 23 and the control unit 4 are units of a single microcontroller.

Figure 3:
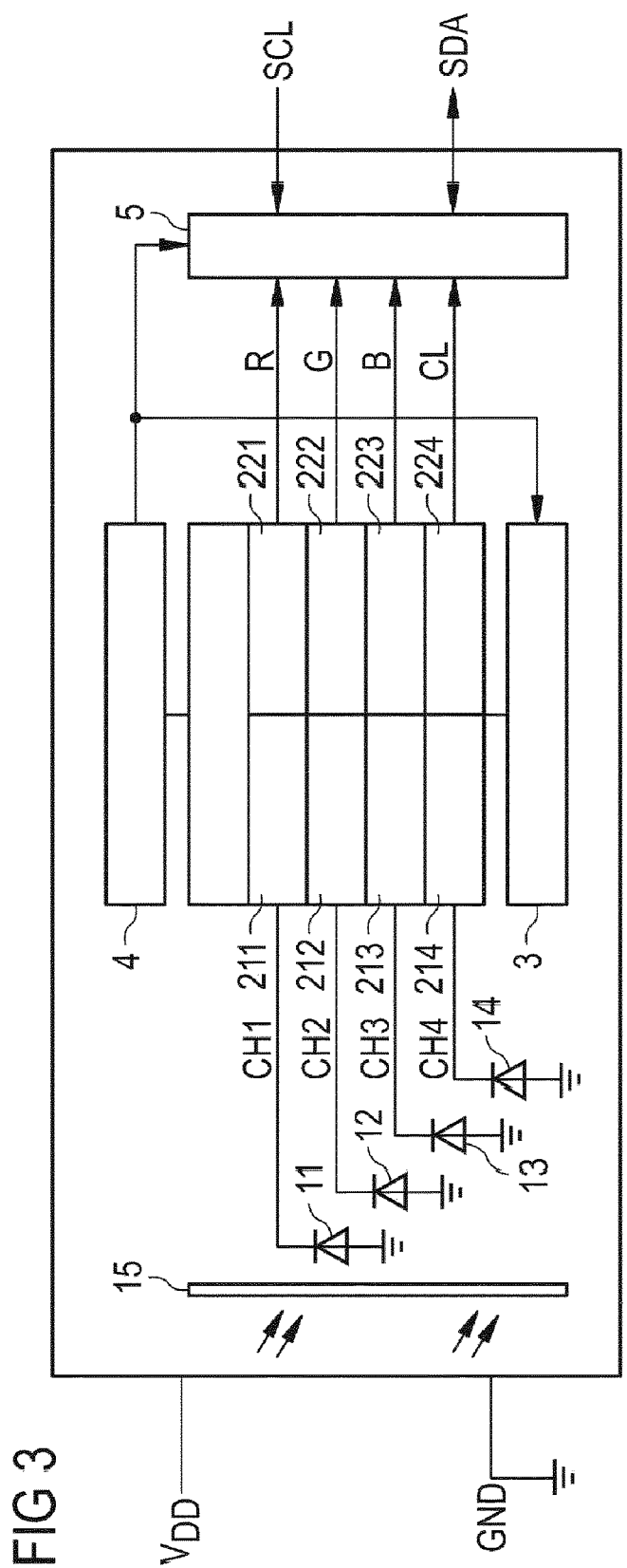
FIG. 3 shows another embodiment of the colour sensor arrangement.

FIG. 3 shows the embodiment of FIG. 1 in more detail. The colour sensor arrangement has a supply terminal VDD and a ground terminal GND. The multi-channel integrating analog-to-digital converter 21 comprises a first, second, third, and fourth analog-to-digital converter 211, 212, 213, 214 for receiving the first, second, third, and fourth channel signals CH1, CH2, CH3, CH4, respectively. The data register 22 comprises corresponding first, second, third and fourth sub-registers 221, 222, 223, 224. The interface 5 is of I²C type and uses two bidirectional open-drain lines as interface terminal 51, i.e. a serial data line SDA and serial clock SCL.

The basic principle of calibration is similar for all embodiments in FIGS. 1 to 3 and will be discussed before explaining the differences in the embodiments. The general goal of the procedure is to relate the raw data produced by the colour sensor 1, i.e. the first, second, third, and fourth channel signals CH1, CH2, CH3, CH4 or the tuples of colour signals R, G, B, to a calibrated tuple of colour signals X, Y, Z which are elements of a standardized colour space. The relation between the raw data and colour space is defined by the calibration data M as will be discussed below. Standardized colour spaces include those established by a number of organizations including the Commission on Illumination (CIE).

In order to determine the calibration data M the colour sensor response under reference conditions need to be recorded. Generally, a colour sensor detects a spectral reflectance distribution under a given lightning condition or directly detects the defined emission of a calibrated light source.

For example, a colour chart can be used as an optical reference and is illuminated by means of a calibration light source, for example, CIE $D_{65}$. The colour chart comprises a number of coloured patches typically arranged in an array of rows and columns. Under illumination the colour sensor records the fraction of incident light that is reflected (with respect to an ideal diffuse reflector) as a function of wavelength, typically from 350 nm to 750 nm. The manufacturer of the colour chart provides nominal values of calibrated tuples of colour signals X, Y, Z that correspond to the colour space values under reference conditions. Knowing these nominal values allows for forming a more accurate estimate of colour by processing the raw tuple of colour signals R, G, B and determining the calibration data M. Alternatively, the emission of the calibration light source, for example CIE $D_{65}$, can be used directly.

A convenient example constitutes a linear matrix whose coefficients are optimized with respect to the spectrum of the illuminating reference light source and implicitly includes the spectral response of any intervening optical components. However, in general there is no restriction placed on the number of coefficients, the type of algorithms used internally or externally such as to linear transformation matrices, the embodiment to colour space transformations, the type of colour-matching functions employed, the number of device outputs (e.g. three for RGB colour sensor), or whether the algorithms are performed on or off the colour sensor arrangement.

For example, the calibration processing operation can be represented in matrix form as x=M·t, wherein t represents a particular tuple of colour signals R, G, B containing the device values captured under reference conditions (see above). M represents a 3×3 colour correction matrix, or, generally, the calibration data M. The symbol · represents a matrix multiplication. The symbol x represents a resulting calibrated tuple of colour signals X, Y, Z which is in terms of a colour space, for example, the CIE[X,Y,Z] colour space. This procedure is repeated for different patches on the colour chart or calibrated light source to be used, and generally results in the representation M=X·T⁻¹, wherein T represents all collected tuples of colour signals R, G, B, and X represents all resulting calibrated tuples of colour signals X, Y, Z. M generally is a n×m colour correction matrix. The colour correction matrix can be computed using an algorithm, e.g. through a numerical optimization procedure, for example, by constructing a linear matrix that minimizes the error across a range of samples in a least-squares sense.

Once the calibration data M is determined, e.g. by means of the calibration matrix M, any tuple of colour signals R, G, B generated by the colour sensor arrangement can be turned into the corresponding calibrated tuple colour signals X, Y, Z. The latter is an element of the standardized colour space and, for example, represents a colour impression as seen by the human eye. In case of the CIE standard the calibrated tuple colour signals X, Y, Z correspond to the tristimulus values.

The calibrated tuple colour signals X, Y, Z can either be calculated off-chip, i.e. by means of an external processing means 6, like in the embodiments of FIGS. 1 and 3. Or the calibrated tuple colour signals X, Y, Z can be calculated on-chip like in the embodiment of FIG. 2 by means of the arithmetic unit 23. The calibration mode differs among the embodiments shown in FIGS. 1 to 3.

The embodiments of FIG. 1 or 3 are calibrated externally by a test system or by the customer, e.g. during post-package test. During the calibration process the external processing means 6 generates the calibration data M, e.g. the RGB to CIE XYZ tristimulus matrix transformation. The control unit 4 receives the calibration data M via the interface 5 and stores the data in the (non-volatile) memory 3. Since testing will be performed in a controlled environment, the device-to-device tolerance can be significantly reduced, and the desired output can be quickly calculated by the customer without having to perform a tristimulus matrix transformation since the calibration data M "tracks" with the colour sensor arrangement. As a second related option, the customer can perform the calibration and be allowed to store the calibration data M in a reserved area on the memory 3 as well. This proposed capability will allow custom coefficients to be stored, for example, during a system level calibration and be able to "track" with the module or engine.

In FIG. 2 the colour sensor arrangement has the integrated arithmetic unit 23 and, thus, the capability of performing a device calibration via the external calibration signal INT that can be initiated by the customer. This proposed capability will allow a calibration (or baseline) to be performed when required and defined by the manufacturer. The design should allow a custom transformation to be optionally loaded in the processing unit 2 for additional value-add. The colour sensor arrangement could also be complemented with a temperature sensor and the calibration data M could also be a function of temperature to account for temperature related effects in the material of the colour sensor arrangement.

The invention claimed is:

1. A color sensor arrangement, comprising:
a color sensor implemented on a chip and configured to generate at least a first channel signal being indicative of a color of light incident on the color sensor;
a processing unit implemented on the chip and connected to the color sensor and configured to generate a tuple of color signals by processing the at least first channel signal;
a memory implemented on the chip and connected to the processing unit;
a control unit implemented on the chip and connected to the processing unit and to the memory, and configured to receive calibration data relating the tuple of color signals to a calibrated tuple of color signals and configured to store the calibration data by means of the memory; and
an interface connected to the processing unit and comprising an interface terminal,
wherein the calibration data is for calibration of the color sensor and is characteristic of the color sensor, and the memory is configured to store the calibration data on the color sensor.

2. The color sensor arrangement according to claim 1, wherein the control unit is configured to receive the calibration data via the interface.

3. The color sensor arrangement according to claim 1, wherein the memory is configured to be read out by an external component or by a dedicated unit of the color sensor arrangement and to provide the calibration data to perform color transformation.

4. The color sensor arrangement according to claim 1, wherein the color sensor comprises an array of photo-elements.

5. The color sensor arrangement according to claim 1, wherein the color sensor comprises:
a first photo-diode configured to generate the first channel signal;
a second photo-diode configured to generate a second channel signal;
a third photo-diode configured to generate a third channel signal;
a fourth photo-diode configured to generate a fourth channel signal; and
the processing unit is configured to generate the tuple of color signals by processing the first, second, third and fourth channel signals.

6. The color sensor arrangement according to claim 5, wherein the color sensor is covered by an infrared blocking filter, and
wherein the first, second, and third photo-diodes are covered by a first, second and third filter, respectively.

7. The color sensor arrangement according to claim 5, wherein the processing unit comprises:
a multi-channel integrating analog-to-digital converter connected to the color sensor for receiving the at least first channel signal; and
a data register connected to the multi-channel integrating analog-to-digital converter for storing the at least a first integrated channel signal.

8. The color sensor arrangement according to claim 7, wherein the multi-channel integrating analog-to-digital converter is further configured for receiving the second, third and fourth channel signals, and
wherein the data register is further configured for storing a second, third and fourth integrated channel signals.

9. The color sensor arrangement according to claim 1, wherein the processing unit comprises an arithmetic unit connected to the memory, and configured to read the calibration data from the memory and transform the tuple of color signals into the calibrated tuple of color signals depending on the calibration data.

10. The color sensor arrangement according to claim 9, wherein the control unit is connected to the interface terminal and is configured to initialize a calibration mode of the color sensor arrangement depending on whether a calibration signal is applied to the interface terminal.

11. The color sensor arrangement according to claim 10, wherein, in the calibration mode, the control unit receives the calibration data via the interface terminal and writes the calibration data into the memory.

12. The color sensor arrangement according to claim 10, wherein, in the calibration mode, the arithmetic unit computes the calibration data from the tuple of color signals and depending on a color model and control logic receives the calibration data via the arithmetic unit and writes the calibration data into the memory.

13. The color sensor arrangement according to claim 10, wherein the interface is configured for bidirectional communication and the control unit is configured for synchronizing the calibration mode to the calibration signal to be applied at the interface terminal.

14. The color sensor arrangement according to claim 1, wherein during a post-package calibration process, calibration data corresponding to coefficients generated by a color transformation algorithm are stored in the memory.

15. The color sensor arrangement according to claim 1, wherein the color sensor is configured to be calibrated externally and the interface provides for the calibration data to be stored in the memory, wherein the calibration data is configurable by a manufacturer, and is readable for subsequent use.

16. The color sensor arrangement according to claim 15, wherein calibration of the color sensor is initiated externally, using the interface, the calibration data and the processing unit.

17. The color sensor arrangement according to claim 1, wherein the processing unit is configured to integrate the first channel signal for a predefined period of time.

18. The color sensor arrangement according to claim 17, wherein a number of counts per the predefined period of time corresponds to measurements of at least one of signal strength or brightness.

19. A method for color sensor calibration, comprising the steps of:
generating at least a first channel signal by means of a color sensor of a color sensor arrangement, the color sensor implemented on a chip, the at least first channel signal being indicative of a color of light reflected and/or emitted from a calibration source;
generating a tuple of color signals by processing the at least first channel signal;
determining calibration data relating the tuple of color signals to a color model; and
writing the calibration data into a memory wherein the memory is comprised by the color sensor arrangement and is implemented on the chip, wherein the calibration data is for calibration of the color sensor and is characteristic of the color sensor, and the memory is configured to store the calibration data on the color sensor, wherein testing corresponding to the calibration is performed in a controlled environment, for reduced device-to-device tolerance, and wherein a particular output can be calculated by a customer without requiring a tristimulus matrix transformation, based on the calibration data tracking with the color sensor arrangement.

20. The method according to claim 19, wherein the calibration source comprises a calibration light source.

21. The method according to claim 19, wherein the tuple of color signals is read by an external processing means.

22. The method according to claim 19, wherein the tuple of color signals is input to an arithmetic unit comprised by the color sensor arrangement, and wherein the calibration data is determined by means of the arithmetic unit and depending on a color model.

* * * * *